United States Patent

[11] 3,598,359

| [72] | Inventor | Beldon L. Rich |
| | | Buffalo Grove, Ill. |
| [21] | Appl. No. | 808,088 |
| [22] | Filed | Mar. 18, 1969 |
| [45] | Patented | Aug. 10, 1971 |
| [73] | Assignee | Parker-Hannifin Corporation |
| | | Cleveland, Ohio |

[54] BISTABLE HYDRAULIC VALVE
2 Claims, 2 Drawing Figs.

[52] U.S. Cl. .................................................. 251/44,
137/596.12, 137/599.1, 60/52 S
[51] Int. Cl. .................................................. F16k 31/12
[50] Field of Search.......................................... 60/52 S;
251/44; 180/92; 137/599, 599.1, 596.12, 596.18,
596.2

[56] References Cited
UNITED STATES PATENTS

| 1,560,770 | 11/1925 | Everstam.................... | 251/44 |
| 3,261,382 | 7/1966 | Ensign........................ | 141/207 |
| 2,267,177 | 12/1941 | Twyman...................... | 91/403 X |
| 2,164,308 | 7/1939 | Centervall................... | 60/52 S |
| 2,192,778 | 3/1940 | Stacy........................... | 60/52 HF X |
| 2,527,943 | 10/1950 | Lee............................. | 60/97 P |
| 2,828,829 | 4/1958 | Lincoln et al................ | 180/79.2 |
| 2,899,006 | 8/1959 | Brown et al................. | 60/52 S X |

Primary Examiner—Edgar W. Geoghegan
Attorneys—Hill, Sherman, Meroni, Gross & Simpson and John N. Wolfram ABSTRACT: a bistable hydraulic valve for controlling fluid flow in a hydraulic line having a main spool valve cooperating with a valve seat in the valve housing to instantaneously stop or permit flow of fluid through the housing. A control circuit disposed in the housing bypassing a portion of the fluid in the hydraulic line from passing through the valve seat and to act on a surface of the main spool valve member to urge the main spool valve against the valve seat with virtually a snap action comparable to a mechanical over center toggle linkage. The control circuit includes a control spool valve actuated by a cam follower on the outside of the housing for regulating the pressure of the fluid acting to close the main spool valve for example, in response to positioning of the steering linkage of a dirigible vehicle. The control circuit further includes a restricted orifice preferably formed in a metal insert which orifice forms a passageway having a length approximately 20 times the diameter of the orifice.

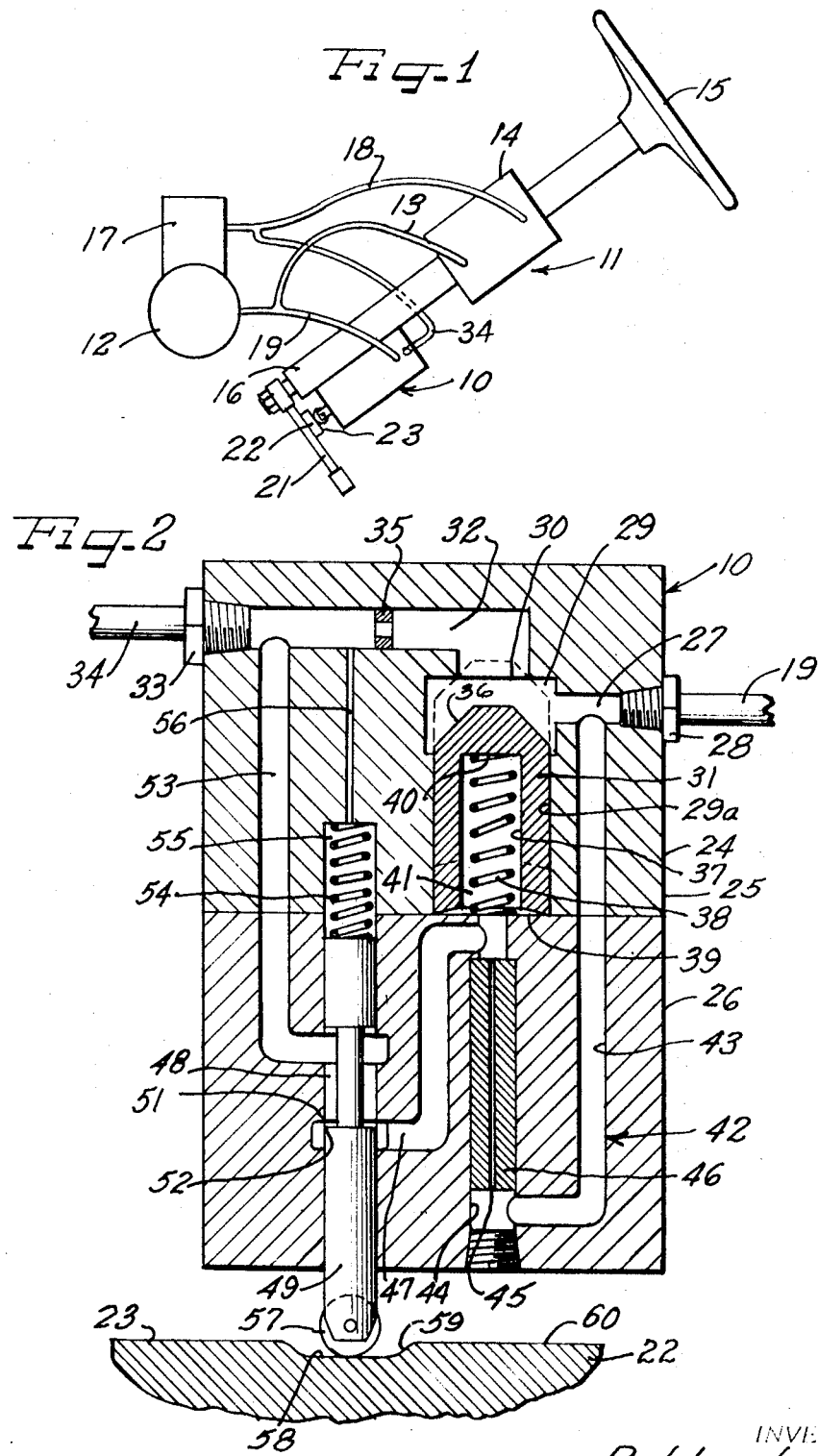

BISTABLE HYDRAULIC VALVE

BACKGROUND OF THE INVENTION

1. Field of The Invention

The present invention pertains to a bistable hydraulic valve for opening and closing a fluid line such as a bypass conduit in a power steering system.

2. Prior Art

In a hydraulic system such as a power steering system for an automobile, the fluid requirements for the steering motor vary considerably from a high requirement occurring during sharp turns at low speeds such as during parking to a low requirement occurring during high speed driving on a straight road. However, since the pump of the system is driven by the engine of the vehicle, the output of the pump is constant for a fixed motor speed regardless of the requirement of the steering motor. Therefore, it is desirable that the power steering system have a bypass means for bypassing a portion of the output of the pump during low fluid requirements of the steering motor.

For the bypass means to function properly, the control valve of the system must instantaneously respond to a signal for opening and closing to regulate the flow through the means. The control valves presently available while moving from an open to close positions in response to a control signal assume an intermediate throttling position which is undesirable. This is especially true of those control valves which respond to a mechanical control signal or are controlled by a follower moving on a cam surface.

SUMMARY OF THE INVENTION

The present invention provides a bistable hydraulic valve for a fluid line having a main valve member for acting with the valve seat and a control spool valve reciprocated by an external signal to control the pressure of a fluid in a control circuit which by the pressure differential positions the main valve with respect to the valve seat to control flow through the inlet and outlet ports. The control circuit includes a restricted passageway which the control fluid passes through prior to acting on the main valve member and the restricted passageway preferably has a ratio between its diameter and its length of 20:1.

Accordingly, an object of the present invention is to provide a bistable hydraulic valve having a valve member reciprocating between a fully opened position and a fully closed position.

Another object of the present invention is to provide a bistable valve for a hydraulic line responsive to an outside signal source which valve upon receipt of the signal instantaneously opens or closes without an intermediate throttle position.

Other objects and advantages will become apparent from the disclosure of the following specification and the appended drawings.

DESCRIPTION OF THE DRAWINGS

FIG. 1 illustrates schematically the use of the present invention in a power steering system; and FIG. 2 is a cross section of the bistable valve of the present invention.

AS SHOWN ON THE DRAWINGS

The present invention is particularly useful in a bistable valve means generally indicated at 10 and illustrated in FIG. 1 as used in a power steering system generally indicated at 11 for a vehicle such as an automobile or truck. The power steering system 11 comprises a hydraulic pump 12 for supplying fluid by a pressure line or conduit 13 to a power steering means 14 such as a power steering motor connected between a steering wheel 15 and the lower steering column 16. The hydraulic pump 12 has a storage tank or sump 17 which is connected by a return or exhaust line or conduit 18 to the steering motor 14. The bistable valve means 10 is connected in a bypass means 19 which interconnects the pressure line 13 and the exhaust line 18. Disposed on the end of the shaft 16 is pitman or arm 21 which is attachable to the steering linkage of the vehicle and supports a pad 22 having a cam surface 23 for supplying the external force for controlling the action of the bistable valve as described in greater detail hereinafter.

The function of the bistable valve means 10 is to enable bypassing of the pressurized hydraulic fluid provided by the pump 12 past the power steering means 14 during those periods of driving in which only a small portion of the output of pump 12 is required for steering the automobile. In some power steering systems, the power steering means 14 is a power assist-type unit which is only actuated or utilized when the steering wheel 15 is turned past a set number of degrees from the center position. Thus, the power steering unit is utilized only after a certain amount or angle of rotation of the steering wheel 15 has occurred. Once the steering wheel 15 has turned through a sufficient angle, the cam surface 23 provides an external signal that causes the bistable valve means 10 to close the bypass means 19 so that the full fluid output of the pump 12 is applied through the steering motor 14. As mentioned above, it is desirable that the switch point be instantaneous so that once the valve receives the signal to close, it closes without an intermediate throttling position and once the valve receives the signal to open to allow the fluid pressure to be bypassed from the steering motor 14, it is desirable that the valve be completely opened in response to the command signal.

As best illustrated in FIG. 2, the bistable hydraulic valve 10 has a housing 24 composed of two sections 25 and 26 which are held together by any conventional means such as bolts. The housing 24 has an inlet means 27 which is a passageway threaded to receive a connector 28 of the inlet side of the bypass means 19. The inlet means 27 extends into a valve cavity or chamber 29 having a valve seat 30 which coacts with a valve member 31 which is the main spool valve that reciprocates in the cavity 29. A fluid outlet means 32 is in communication with the chamber 29 through the aperture defined by the valve seat 30. Thus, reciprocation of the valve member 31 to a position engaging the valve seat 30, as illustrated in the dashed lines, stops the flow from the inlet means 27 to the outlet means 32.

The outlet means 32, as illustrated, is a passageway terminating in a threaded portion to receive a coupling 33 which attaches the conduit 34 on the return side of the bypass means 19. As illustrated, the outlet means 32 contains a restrictive orifice 35 to ensure the necessary back pressure to act on a valve face or seating surface 36 of the valve member 31 to hold the valve member in the open position. If the diameter of the outlet means 32 is smaller than the diameter of inlet means 27, the restrictive orifice 35 is not necessary. However, as illustrated the outlet means has a larger diameter, and to insure the desired back pressure acting on the seating surface 36, an insert having the orifice 35 is supplied.

The valve member 31 which is the main spool valve has the valve face 36 on one end, which face has a frustoconical configuration to facilitate the sealing engagement with the valve seat 30. On the end opposite the valve face 36 is a bore 37 such as a counterbore for receiving a resilient means such as spring 38. An annular surface 39 surrounds the bore 37 which terminates in a bottom surface 40.

The valve cavity 29 has a portion 29a in which the valve member 31 is received for reciprocation between the opened and closed positions with a sealing engagement so that the walls of the portion 29a and the surface 39 and 40 define a pressure chamber 41. Thus the valve member 31 acts as a piston in a cylinder defined by the portion 29a of the cavity 29 and has fluid acting surfaces defined by the surfaces 39 and 40.

To supply the fluid pressure to the pressure chamber 41 for acting on surfaces 39 and 40, a control circuit generally indicated at 42 comprises a passageway 43 extending from the inlet means 27 and terminating in a passageway 44 which extends into communication with the pressure chamber 41. The passageway 44 is provided with a restricted passageway 45 which is considerably elongated relative to its diameter, i.e., it has a length substantially greater than the diameter and which causes a pressure drop in fluid passing therethrough. As illustrated the passageway 45 is provided in an insert 46 and the preferred ratio between its diameter and its length is in the order of about 20:1 although the desirable results of this invention appear to be obtainable if the ratio is maintained in the range of from about 10:1 to 25:1. Between the point of the termination of the insert 46 and the valve chamber 29, an exhaust passageway 47 extends from the passageway 44 to a spool valve chamber 48 of the control spool valve 49.

The valve chamber 48 has a valve seat 51 coacting with the valve seat edge or surface 52 of the spool valve 49 to regulate flow from the passage 47 into the spool valve chamber 48. To exhaust fluid entering into the spool valve chamber 48, a passageway 53 extends to the outlet means 32 and as illustrated is downstream from the insert containing the restriction orifice 35.

To bias the spool valve 49 to an open position, a resilient means such as a spring 54 is placed in a portion 55 of the spool chamber 48 to act on the spool valve 49. To prevent accumulation of fluid in the portion of the cavity 48 containing the spring 54 and to prevent a fluid pressure from resisting the movement of the spool valve 49, a vent 56 extending to the outlet means 32 is preferably provided.

The control spool valve 49 has a portion extending out of the housing 24 terminating in a cam follower such as a roller 57 which coacts with a cam surface 23 to reciprocate the control spool 49 against the spring means 54 to move the surface 52 relative to the seat 51 to control fluid flow through the valve chamber 48. As illustrated, the cam surface 23 has a depression 58 in which the follower 57 is in contact to allow the fluid in the control circuit to pass from the passageway 47 through the valve chamber 49 into the passageway 53 to the exhaust means. The relative movement of the cam surface 23 caused by the pivoting of the arm 21 causes the roller 57 to ride up an inclined surface 59 to a higher level or high point 60. Such movement to the high point 60 causes the control spool valve 49 to move the close the escape of the fluid past the valve seat 51 with a resulting buildup of pressure in the chamber 41 to act on surfaces 39 and 40 to move the main spool 31 to the closed position. In an exemplary embodiment of the invention clearance between the valve seat 51 and the surface 52 is approximately 0.010—0.015 inches when the control spool is in the illustrated opened position. With this clearance the flow of the fluid through the passageway 45 is exhausted into the passageway 47 and the pressure differential of the fluid in the valve chamber 29 acting on the valve face 36 is sufficient to counteract the force of the spring 38 and the force of the fluid pressure in the pressure chamber 41 acting on the surfaces 39 and 40. With a slight movement of the spool valve 49 to reduce the clearance between the valve seat 51 and the surface 52 by as little as 0.001 inches, the pressure buildup in the pressure chamber 41 and passageway 44 adjacent to the chamber 41 acts on the surfaces 40 and 39 with sufficient force and in coaction with the force of the spring 38 to force the valve member 31 to the closed position illustrated in dashed lines.

Applicant believes that the cause of this phenomenon is that the fluid in the control circuit passing through the orifice passageway 45 is in a turbulent state when the spool valve 49 is in the open position and that reduction of the clearance between the valve seat 51 and the surface 52 causes the flow to become a laminar flow which will develop a higher pressure giving an instant pressure buildup in the pressure chamber 41 acting on surfaces 40, 39 of sufficient force to overcome the holding force acting on the seating surface 36. Regardless of the theory for the functioning of the valve, the results are that the valve member 31 shifts from the position illustrated to the closed position without assuming any intermediate position when the clearance between seat 51 and surface 52 is reduced by as little as 0.001 inches.

When the cam 23 is moved so that the follower 57 moves from the high point 60 to the depression 58, the spring 54 causes the follower to remain in contact with the cam surface and the movement of the spool valve 49 to the opened position provides sufficient clearance between the valve seat 51 and the surface 52 to allow the removal of the pressure acting on the surfaces 40 and 39 of the valve member 31. Since the fluid pressure in passageway 27 has increased with the valve member 31 on the seat 30, the force of the fluid pressure acting on the seating surface 36 even with a reduced amount of exposed surface is sufficient to force the valve member 31 from the closed to the open position when roller 57 moves into the depression 58. It should be realized that once the valve member 31 is unseated from the seat 30, the entire seating surface 36 is exposed and the increased exposed area for application of the fluid pressure of passageway 27 causes the valve member 31 to snap back to the open position against the force of the spring 38 and the fluid pressure in the chamber 41.

The bistable hydraulic valve 10 when used in a power steering system or assembly 11 quickly opens and closes the bypass means 19 in response to movement of the pivot arm or pitman 21 supporting the cam surface 23. By changing the length of the depression 58 of the cam surface 23, the degree or angle of the arc of movement of the pivot arm 21 necessary before flow is stopped in the bypass means 19 can be adjusted. Thus the bistable valve by proper selection of the contour of the cam surface 23 enables the minimum number of degrees of rotation for the steering wheel and the pivot arm 21 prior to applying the full force of the fluid generated by the pump 12 to the steering motor 14. The steering system 11 including the bistable hydraulic valve 10 can thus allow slight amounts of turning of the steering wheel 15 which may occur during driving on a straight road prior to engaging the full force of the power steering motor 14 to the steering system.

It will be understood that various modifications may be suggested by the embodiment disclosed, but I desire to claim within the scope of the patent warranted hereon all such modifications which come within the scope of my contribution to the art.

I claim as my invention:

1. A bistable valve for controlling fluid flow through a conduit said valve comprising: a housing having a main valve chamber, a single inlet and a single outlet each connected to the valve chamber, said chamber having a valve seat between said inlet and outlet; a main valve member having a pressure acting surface being disposed in said valve chamber and being moveable between a closed position against said valve seat to stop fluid flow into said outlet and an open position allowing flow from the inlet means through the valve chamber to the outlet, said main valve member having a portion adjacent the pressure acting surface slidably and sealingly received in the valve chamber to define a pressure chamber wherein fluid pressure in said pressure chamber acting on said pressure acting surface urges the valve member to said closed position; and control fluid circuit means disposed in said housing for regulating the fluid pressure applied to the pressure chamber to control the position of the main valve member, said control fluid circuit means including a first passageway in the housing connected to the inlet upstream of the valve chamber and communicating with said pressure chamber adjacent said pressure acting surface, an exhaust passageway connecting the first passageway to the outlet, said exhaust passageway including a pilot valve for controlling the flow there through, said pilot valve being moveable to a first position enabling flow through the exhaust passageway and having a portion extending out of said housing and adapted to receive an external signal to move the valve to a second position restricting flow through the exhaust passageway and increasing the pressure of the control fluid applied to the pressure chamber to force the main valve member to the closed position to stop flow through the main valve chamber from the inlet to the outlet, said first passageway containing a straight restricted orifice directed towards said pressure acting surface and of a length at least 10 times its diameter whereby flow there through when the pilot valve is moved to said first position is relatively great and is in a turbulent state with consequent relatively greater pressure drop there through so that pressure in said chamber acting on the pressure acting surface is minimized and said main valve member moves quickly to its open position, and whereby when the pilot valve is moved to its second position flow through the restricted orifice reduces and becomes laminar with consequent less pressure drop there through so that pressure in the chamber acting on the pressure acting surface becomes maximized to quickly close the main valve.

2. A bistable valve according to claim 1, wherein the outlet includes a restrictive means to insure a desired back pressure in the fluid passing through the main valve chamber to hold the main valve member in the open position, and wherein the exhaust passageway communicates with the outlet on the exhaust side of said restrictive means.